(12) United States Patent
Prasad

(10) Patent No.: US 11,676,091 B2
(45) Date of Patent: Jun. 13, 2023

(54) PRODUCT BENCHMARKING

(71) Applicant: Dassault Systemes Americas Corp., Waltham, MA (US)

(72) Inventor: Ajay Prasad, Rochester Hills, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 292 days.

(21) Appl. No.: 15/785,911

(22) Filed: Oct. 17, 2017

(65) Prior Publication Data

US 2019/0114570 A1    Apr. 18, 2019

(51) Int. Cl.
*G06Q 10/0639*   (2023.01)
*G06Q 10/067*    (2023.01)
(Continued)

(52) U.S. Cl.
CPC ..... *G06Q 10/06393* (2013.01); *G06F 16/288* (2019.01); *G06Q 10/067* (2013.01); *G06Q 10/0637* (2013.01); *G06Q 30/0203* (2013.01)

(58) Field of Classification Search
USPC .......................................................... 705/7.39
See application file for complete search history.

(56) References Cited

U.S. PATENT DOCUMENTS 7,082,403 B2 * 7/2006 Wagner ............... G06Q 10/0639
                                                    705/7.29
8,078,489 B1 * 12/2011 Marsten ................. G06Q 10/04
                                                    705/7.25

(Continued)

FOREIGN PATENT DOCUMENTS

JP    2003099584    4/2003
JP    2003157345 A  5/2003
(Continued)

OTHER PUBLICATIONS

ElMaraghy et al., Managing variations in products, processes and manufacturing systems, 2009, CIRP Annals, vol. 58, Issue 1, pp. 441-446 (Year: 2009).*

(Continued)

*Primary Examiner* — Brian M Epstein
*Assistant Examiner* — Allison M Neal
(74) *Attorney, Agent, or Firm* — Hamilton, Brook, Smith & Reynolds, P.C.

(57) ABSTRACT

Embodiments are directed to computer systems and methods that provide a data-driven approach to product benchmarking. The systems and methods identify a product being developed on a product development platform. The systems and methods repeatedly evaluate products similar in operation to the identified product. In response to the evaluation, the systems and methods automatically determine current performance capabilities of the similar products and digitize the determined current performance capabilities as current benchmark parameters in a central database integrated within the platform. The systems and methods generate output, by an application of the platform, based on searching the current benchmark parameters in the database, and develop functions and parts for the identified product using the generated output. For example, the systems and methods may invoke a modeling application of the platform to automatically determine a part for the identified product by performing a simulation using the searched current benchmark parameters.

17 Claims, 9 Drawing Sheets

(51) Int. Cl.
  *G06Q 30/0203* (2023.01)
  *G06F 16/28* (2019.01)
  *G06Q 10/0637* (2023.01)

(56) References Cited

U.S. PATENT DOCUMENTS

| | | | |
|---|---|---|---|
| 8,781,882 B1* | 7/2014 | Arboletti | G06Q 10/0639 705/7.41 |
| 2002/0174004 A1 | 11/2002 | Wagner et al. | |
| 2005/0080502 A1 | 4/2005 | Chernyak et al. | |
| 2005/0102050 A1* | 5/2005 | Richey | G05B 19/401 700/97 |
| 2005/0273218 A1 | 12/2005 | Breed et al. | |
| 2007/0266080 A1 | 11/2007 | McNicol et al. | |
| 2009/0037869 A1 | 2/2009 | Hamilton et al. | |
| 2010/0191579 A1* | 7/2010 | Sudarshan | G06Q 10/067 705/7.29 |
| 2013/0066897 A1 | 3/2013 | Ehrenberg et al. | |
| 2015/0339626 A1* | 11/2015 | Foster | G06Q 50/04 705/29 |
| 2015/0356205 A1* | 12/2015 | Nalluri | G06F 30/00 703/1 |
| 2016/0132595 A1 | 5/2016 | Bliss et al. | |
| 2016/0314423 A1 | 10/2016 | Mole et al. | |
| 2017/0316125 A1* | 11/2017 | Jacobson | G06F 16/254 |
| 2018/0004874 A1* | 1/2018 | Lange | G06F 30/23 |
| 2018/0144277 A1* | 5/2018 | Srivastava | G06Q 10/06315 |
| 2018/0189690 A1* | 7/2018 | Chan | G06Q 10/06 |

FOREIGN PATENT DOCUMENTS

| | | |
|---|---|---|
| JP | 2007087300 | 4/2007 |
| JP | 2007087302 | 4/2007 |
| JP | 2009104562 | 5/2009 |
| JP | 2009187294 | 8/2009 |
| JP | 2017174409 | 9/2017 |

OTHER PUBLICATIONS

Fuller, D., "What Size Fuel Pump Do I Need? Your Top Tech Questions Answered!", http://www.onallcylinders.com/2013/05/16/what-size-fuel-pump-do-i-need-your-top-tech, May 16, 2013, 5 pages, retrieved from Internet Sep. 27, 2017.

European Search Report for European Application No. EP 18200838, titled: Product Benchmarking, Date of Completion: Dec. 13, 2018, 2 pages.

* cited by examiner

| REQUIREMENT SPECIFICATION | HARDWARE PRODUCT 1 | HARDWARE PRODUCT 2 | HARDWARE PRODUCT N |
|---|---|---|---|
| REQUIREMENT 1 | BENCHMARK VALUE FOR REQUIREMENT 1 HARDWARE PRODUCT 1 | BENCHMARK VALUE FOR REQUIREMENT 1 HARDWARE PRODUCT 2 | BENCHMARK VALUE FOR REQUIREMENT 1 HARDWARE PRODUCT N |
| REQUIREMENT 1.1 | BENCHMARK VALUE FOR REQUIREMENT 1.1 HARDWARE PRODUCT 1 | BENCHMARK VALUE FOR REQUIREMENT 1.1 HARDWARE PRODUCT 2 | BENCHMARK VALUE FOR REQUIREMENT 1.1 HARDWARE PRODUCT N |
| REQUIREMENT 1.2 | BENCHMARK VALUE FOR REQUIREMENT 1.2 HARDWARE PRODUCT 1 | BENCHMARK VALUE FOR REQUIREMENT 1.2 HARDWARE PRODUCT 2 | BENCHMARK VALUE FOR REQUIREMENT 1.2 HARDWARE PRODUCT N |
| REQUIREMENT 1.N | BENCHMARK VALUE FOR REQUIREMENT 1.N HARDWARE PRODUCT 1 | BENCHMARK VALUE FOR REQUIREMENT 1.N HARDWARE PRODUCT 2 | BENCHMARK VALUE FOR REQUIREMENT 1.N HARDWARE PRODUCT N |
| REQUIREMENT 2 | BENCHMARK VALUE FOR REQUIREMENT 2 HARDWARE PRODUCT 1 | BENCHMARK VALUE FOR REQUIREMENT 2 HARDWARE PRODUCT 2 | BENCHMARK VALUE FOR REQUIREMENT 2 HARDWARE PRODUCT N |
| REQUIREMENT N | BENCHMARK VALUE FOR REQUIREMENT N HARDWARE PRODUCT 1 | BENCHMARK VALUE FOR REQUIREMENT N HARDWARE PRODUCT 2 | BENCHMARK VALUE FOR REQUIREMENT N HARDWARE PRODUCT N |

| Name | | UOM | Benchmark Vehicles | | |
|---|---|---|---|---|---|
| | Item | | 1Car | 2Car | 3Car |
| ☐ DS Car Specification | Benchmark Specs | | | | |
| ☐ ADR angle Measurement | Angle Measurement | | | | |
| ☐ Centre of Gravity & 'H' po | Centre of Gravity & 'H' point Measurement | | | | |
| ☐ Effective Leg Room - | Effective Leg Room - Second | mm | | | |
| ☐ Front Wheel Centreline | Front Wheel Centerline to SgRP-Front | mm | | | |
| ☐ H Point from Ground | H Point from Ground (H51) First Row | mm | | | |
| ☐ H point from Ground | H Point from Ground Front Seat | mm | | | |
| ☐ H Point to from Grou | H Point to from Ground second Row | mm | | | |
| ☐ Pedal Point to H Point | Pedal Point to H Point | mm | | | |
| ☐ Static Stability Factor | SSF | mm | 198 | 100 | 170 |
| ☐ Steering Wheel Cent | SSF | mm | 1000 | 914 | 800 |
| ☐ X' Direction | X' Direction | mm | 15 | 14 | 18 |
| ☐ Y' Direction | Y' Direction | mm | | | |
| ☐ Z' Direction | Z' Direction | mm | 888 | 837 | 800 |
| ☐ Cluch Efforts and Hyster | Cluch Efforts and Hystersis Measurement | | | | |
| ☐ Efforts Measurement | Efforts Measurement | | | | |
| ☐ Efforts Measurement (B | Efforts Measurement | | | | |

30 objects

PRODUCT BENCHMARKING

BACKGROUND

When a company undertakes development of a new product, such as an automobile, the company first identifies existing competing products in the same product space or industry as the new product. The company then benchmarks desired capabilities of the new product against determined capabilities of the competing products. The company's product benchmarking of the desired capabilities is critical for developing the new product to differentiate in performance from the competing products.

Such product benchmarking is typically a cumbersome process that involves manually updating and comparing detailed spreadsheet files (e.g., EXCEL files) for each of the competing products. For example, a test engineer may manually enter results (capabilities) determined from tests run on each component of the competing products into the spreadsheet files, which are electronically compared to benchmark the competing products' capabilities. As such, each spreadsheet file contains a large amount of product benchmark information indicating the determined capabilities of a competing product. Due to the large size of the spreadsheet files (often more than 1 gigabytes in size), many companies must build utilities just to enable comparing of these spreadsheet files.

Further, maintaining and using the product benchmark information in these spreadsheet files by a company is inefficient, time consuming, and prone to errors. When adding new product benchmark information or changing existing product benchmark information, spreadsheet files for each of the competing products must be manually and individually updated and labeled with a new version. The spreadsheet files are tracked for use according to their corresponding versions. Therefore, if one or more spreadsheet files are not immediately or properly updated with the new version, or configuration of company systems or applications are not updated to access the new version, the company may develop a new product's capabilities based on outdated product benchmark information. In addition, to use these spreadsheet files for product benchmarking, a slow, inefficient file-based electronic comparison must be performed on the spreadsheet files, which limits the application of the comparison results in the product development process.

SUMMARY

Embodiments of the present invention address the deficiencies in the previous product benchmarking approach by providing a data-driven solution for product benchmarking of an identified product under development. Rather than using spreadsheet files, these embodiments integrate product benchmarking into a product development platform, such as an enterprise Product Lifecycle Management (PLM) backbone platform or system, on which an identified product is being developed.

To do so, as current capabilities of similar (competing) products to the identified product are determined from repeated testing and measuring of the similar products, embodiments digitize the current determined capabilities in a central database integrated within the product development platform. For example, in some embodiments, as sensors installed on components of the tested products take measurements of the components, or simulations of the tested products generate measurements of modeled product components, the embodiments apply automated rules (computer processing) to the measurements. The computer implemented rules determine and digitize current capabilities of the products in the central database integrated within the product development platform (e.g., by use of a data model). In developing the identified product, applications of the product development platform, which are integrated with the central database, are driven by the digitized current determined capabilities, as (at the instance) the current determined capabilities or values of the current determined capabilities change. This integrated and data-driven solution for product benchmarking overcomes the problems encountered by previous (prior art) approaches using versioned spreadsheet files for product benchmarking.

Further, in example embodiments, the integrated central database and applications of the product development platform may be configured to support this product benchmarking solution, without the need to design or implement changes to the platform. For instance, in the ENOVIA Product Lifecycle Management (PLM) platform, the example embodiments may digitize current determined capabilities of the similar products in existing product requirements components of the ENOVIA database. Further, the example embodiments may use the ENOVIA Requirements Manager application, which is a solution (tool) of the ENOVIA PLM platform that typically enables users to define complex products, including their functionality and logical components, and link requirements for the complex products to program and project management activities to establish full traceability of the product development. These example embodiments use the Requirements Manager application in a new way by configuring the Requirements Manager application with custom rules (e.g., custom database attributes) that define benchmark relationships, using the existing product requirements components, in a data model used to digitize the current determined capabilities in the ENOVIA database. Further, a Grid browser user interface, through a new customized interface configuration with the ENOVIA Requirements Manager application, enables the ENOVIA Requirements Manager application to dynamically present the digitized current determined capabilities of the similar products, in a data-driven manner, from the product requirements components of the ENOVIA database to users for viewing, updating, filtering, comparing, and the like at the Grid browser user interface.

Embodiments of the present invention are directed to a computer systems, computer-implemented methods, and computer program products. The computer systems comprise a processor and a memory with computer code instructions stored thereon. The memory is operatively coupled to the processor such that, when executed by the processor, the computer code instructions cause the computer system to implement a development module, digitization module, output module, and modeler module for developing a product. The computer program products comprise a non-transitory computer-readable storage medium having code instructions stored thereon, the storage medium operatively coupled to a processor such that, when executed by the processor, the computer code instructions cause the processor to develop a product.

The computer systems (e.g., via the development module), methods, and program products identify a product being developed on a product development platform. In some example embodiments, the identified product is an automobile being developed on a product development platform. The computer systems (e.g., via the digitization module), methods, and program products digitize current benchmark parameters of one or more products similar in operation to the identified product being developed. To do so, the computer systems, methods, and program products repeatedly evaluate one or more products similar in operation to the identified product. For example, if the identified product is an automobile, the repeated evaluations of the one or more similar (competing) automobiles may be performed by executing tests and taking measurements at components of the one or more similar automobiles during the tests.

In response to the evaluation, the computer systems, methods, and program products determine current performance capabilities of the one or more similar products. In some embodiments, the computer systems, methods, and program products automatically process a spreadsheet that includes recorded measurements taken of the one or more similar products while tests are performed on the one or more similar products and determine current performance capabilities by applying automated rules to the recorded measurements. In some embodiments, the computer systems, methods, and program products execute a modeling application that simulates operations of the one or more similar products and determine current performance capabilities from measurements generated from the simulated operations. In some embodiments, the computer systems, methods, and program products automatically collect measurements taken by sensors configured on the one or more similar products and determine current performance capabilities by applying automated rules to the collected measurements. In some embodiments, the computer systems, methods, and program products automatically feed current performance capabilities from web-based applications of vendors associated with the one or more similar products or automatically parse the current performance capabilities from consumer surveys or other product literature on the one or more similar products.

In response to the evaluation, the computer systems, methods, and program products further digitize the determined current performance capabilities as current benchmark parameters in a central database integrated within the product development platform. In example embodiments, the product development platform is a product lifecycle management (PLM) platform. In example embodiments, the central database is the ENOVIA database. The digitizing of the current performance capabilities may include at least one of: adding, deleting, updating, filtering, and comparing existing benchmark parameters in the central database to generate the current benchmark parameters. The digitized current benchmark parameters in the central database are continuously accurate and instantly visible to different users of the product development platform, including users associated with one or more of: project management, product definition, engineering, manufacturing, sourcing, and testing.

The computer systems (e.g., via the output module), methods, and program products generate output, by an application of the product development platform, based on searching the current benchmark parameters in the central database. The computer systems (e.g., via the development module), methods, and program products develop functions and parts (components) for the identified product using the generated output. In some embodiments, the computer systems (e.g., via the output module), methods, and program products generate output by invoking (causing) a modeling application of the product development platform to automatically determine a part (component) for the identified product based on performing a simulation using the searched current benchmark parameters. In some embodiments, the computer systems (e.g., via the output module), methods, and program products generate output by invoking (causing) a manufacturing application or system (controller), such as a manufacturing execution system (MES), integrated with the product development platform to automatically assemble a prototype of the identified product with a part based on analyzing the current benchmark parameters. In some embodiments, the computer systems (e.g., via the output module), methods, and program products generate output by a user interface application of the product development platform displaying to a user a matrix having (i) columns representing the one or more similar products, (ii) rows representing the current benchmark parameters, and (iii) cells each representing the associated value of an intersecting similar product and current benchmark parameter in the matrix. In some embodiments, the user interface application is the Grid browser user interface application of the ENOVIA PLM platform, in a customized configuration with the Requirements Manager application of the ENOVIA PLM platform. In embodiments, other grid browser type user interfaces are suitable.

In some embodiments, the computer systems (e.g., via a modeler module), methods, and program products generate a data-driven model defining relationships of each current benchmark parameter. In these embodiments, for a given current benchmark parameter, the computer systems, methods, and program products include in each defined relationship an attribute representing a value of the given benchmark parameter. The attribute connects the given current benchmark parameter to a product of the one or more similar products in the data-driven model. In these embodiments, the computer systems, methods, and program products search, by the application of the product development platform, the current benchmark parameters based on the generated data-driven model.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 3A-3D are block diagrams depicting a data-driven model for performing product benchmarking in an example embodiment of the present invention.

DETAILED DESCRIPTION

A description of example embodiments follows.

The described embodiments include methods, systems, and program products for developing an identified product on a product development platform, such as a Product Lifecycle Management (PLM) platform, using product benchmarking. Embodiments of the present invention address the deficiencies in previous product benchmarking approaches by providing a data-driven solution for product benchmarking the identified product under development (i.e., determining critical success factors, physical or engineering, and features for developing the identified product). Rather than using the file-based (e.g., EXCEL spreadsheet) solution of previous approaches, these embodiments integrate product benchmarking into the product development platform on which the identified product is being developed. For example, as current performance capabilities of products similar in operation to the identified product are determined (e.g., through tests and measurements), these embodiments continuously digitize the current performance capabilities as current benchmark parameters in a central database integrated into the product development platform. The digitizing in the central database of the product development platform continuously adds these current benchmark parameters to the knowledge repository across the entire organization. Systems and applications integrated with the product development platform are then driven by the current benchmark parameters, even as the current performance capabilities of the similar products change, in developing functions and parts for the identified product under development.

System for Product Benchmarking

Figure 1:
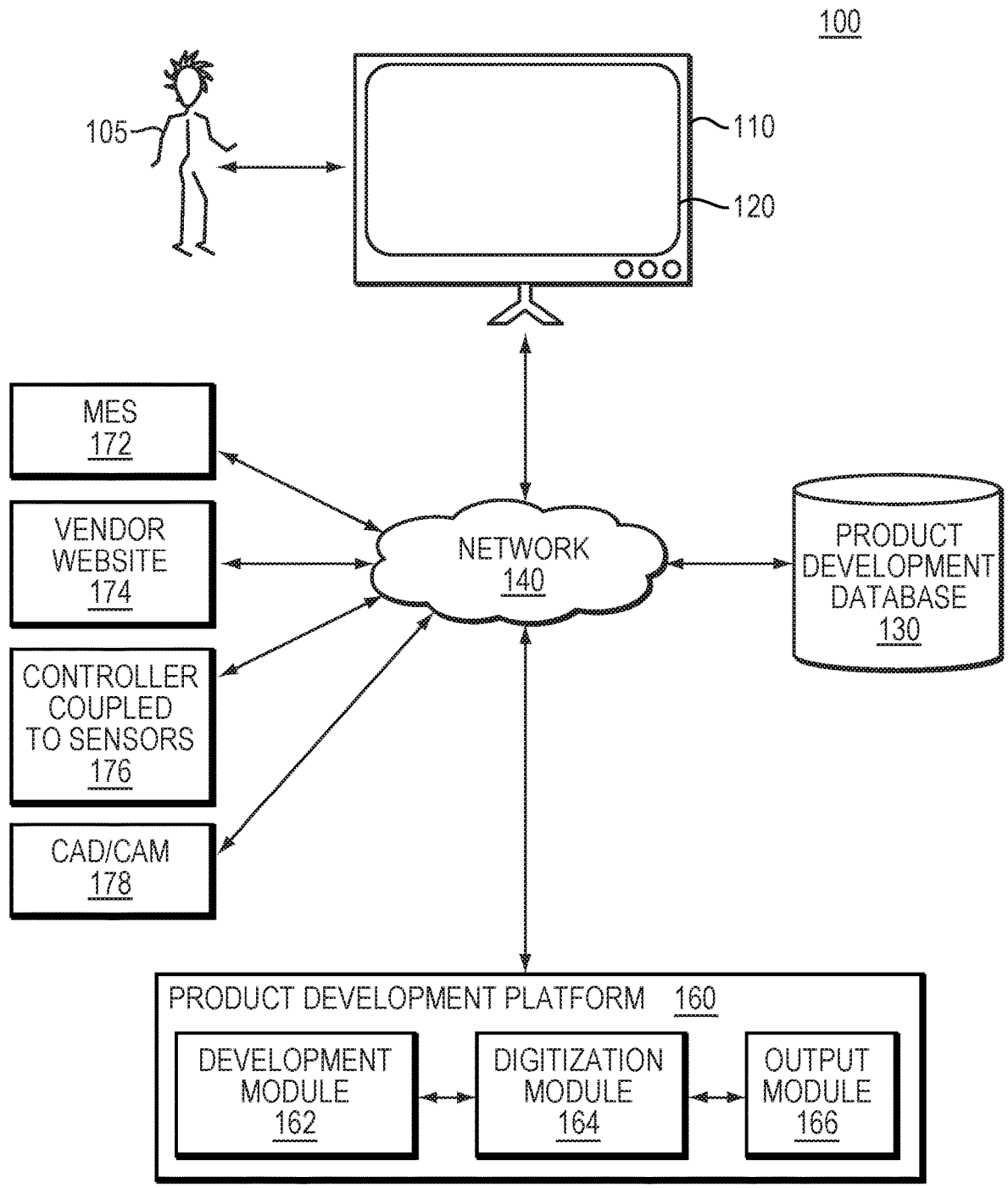
FIG. 1 is a block diagram depicting an example computer system for developing a product using product benchmarking in embodiments of the present invention.

FIG. 1 is a block diagram depicting an example computer system 100 for developing a product using product benchmarking in embodiments of the present invention. The system 100 includes a display device 110 that enables a user 105 (e.g., product developer) to interact with the system 100 via a user interface application 120 presented on the display device 110. The user 105 provides input through the user interface 120 of the display device 110, which the display device 110 communicates to a product development platform 160. In some embodiments, the product development platform 160 is a product lifecycle management (PLM) system. The product development platform 160 is configured on one or more computer devices comprising one or more processors operatively coupled to memory with computer code instructions stored thereon, such that when executed by the processor, the computer code instructions cause the one or more processors to implement a development module 162, a digitization module 164, and an output module 166. The development module 162 of the product development platform 160 is configured to receive (through a communications network 140 for example) the user input, and, based on the user input, identify a product being developed on a product development platform.

The development module 162 is communicatively coupled to the digitization module 164 of the product development platform 160. The digitization module 164 is configured to digitize capabilities of one or more products similar in operation to the identified product being developed for the function of benchmarking the digitized capabilities against the desired capabilities of the identified product. To do so, the digitization module 164 receives repeated evaluations of one or more products similar in operation to the identified products, such as competing products in the same product space or industry as the new product. In response to receipt of the repeated evaluations, the digitization module 164 may determine current performance capabilities of the one or more similar products.

For example, as part of the repeated evaluations of a given similar product, a set of tests may be executed (run) on the given similar product. Measurements of various basic components (i.e., "nuts and bolts") of the given similar product may be taken during execution of the set of tests. In some example embodiments, sensors configured on the various basic components of the given similar product may automatically take measurements of the components during the execution of the set of tests. A controller 176 communicatively coupled to the sensors may collect and directly feed the measurements taken by the sensors of the various basic product components to the digitization module 164, through communications network 140.

In another example, a test engineer or other such test personnel may take measurement (e.g., using automated tools) of the various basic product components during the execution of the set of tests. The test engineer may provide the measurements of the various basic product components to the digitization module 164 of the product development platform 160 via the user interface application 120 of display device 110. The test engineer may also record the measurements of the various basic product components in a file, such as a spreadsheet (e.g., EXCEL) file, which may be provided to the digitization module 164 by automatically downloading the spreadsheet using the user interface 120 of the display device 110.

In yet another example, the given similar product may be modeled using a computer-aided design (CAD) or computer-aided manufacturing (CAM) simulation application 178 of the product development platform 160, which is communicatively coupled to the digitization module 164 through network 140. The simulation application 178 may simulate the set of tests on the modeled product and take measurements of various modeled basic components of the modeled product during the simulated set of tests. The simulation application 178 may transmit the simulated measurements of the various modeled product components to the digitization module 164.

The digitization module 164 may apply automated rules to the received measurements of the various basic product components (e.g., taken by the sensors, simulation application, or test engineer using automated tools) of the given similar product to determine current performance capabilities of the given similar product. The automated rules may apply different formulas, weights, parameters, and the like to the measurements from the different basic product components to determine current performance capabilities of the given similar product. The digitization module 164 may similarly receive measurements for one or more other similar products and apply automated rules to the received measurements to determine respective current performance capabilities of the one or more other similar products. In some embodiments, the controller 176, user (via automated tools), simulation application 178, or such may apply the automated rules to determine the current performance capabilities, and provide via the user interface 120 or transmit via a communication interface across network 140 instead the determined current performance capabilities to the digitization module 164.

The digitization module 164 may also be configured to automatically retrieve current performance capabilities for similar products of the identified product via applications and literature accessible from vendor websites 174 or other third-party websites. For example, the digitization module 164 may periodically (e.g., hourly, daily, and the like) access a search engine or other automated feed accessible from the vendor website 174 to search and download current performance capabilities of a particular similar product as determined and provided by a given vendor. The digitization module 164 may also periodically access product literature, consumer surveys, and the like from the vendor website 174, which the digitization module 164 parses using automated rules to locate current performance capabilities of a particular similar product as determined and provided by the given vendor. The digitization module 164 may instead or in addition access other information (e.g., measurements, configurations, and such) from the search engine, automated feed, product literature, consumer surveys, and the like and apply automated rules to determine the current performance capabilities of the particular similar product.

The digitization module 164 digitizes the determined current performance capabilities in the central (product development) database 130 integrated within the product development platform 160. A modeler module coupled to the digitization module 164 may define relationships (represented by corresponding benchmark attribute values in the central database 130) between the current performance capabilities and the one or more similar products in a data model. In this way, the digitized current performance capabilities of the similar products are instantly and accurately available to each user 105 of the product development platform 160, and to each system (e.g., MES 172) and application (e.g., CAD/CAM 178 or user interface application 120) integrated with the product development platform 160 from the central database 130. In communication with the output module 166 coupled to the digitization module 164, these applications (e.g., CAD/CAM 178 or user interface application 120) and systems (e.g., MES 172) generate output, in a data-driven manner, based on searching the digitized current capabilities (in accordance with the data model) in the central database 130. The product development platform 160 uses the generated output to develop and manufacture functions and parts for the identified product.

For example, as the CAM application 178 simulated the identified product being developed, the CAM application 178 may search the digitized current capabilities of similar products in the integrated central database 130 to locate data specific to a particular simulated function of the identified product, such as battery power utilization. From the search of the central database 130 (e.g., via a database server), the CAM application 178 may receive the current (real-time) performance capabilities related to battery power utilization of one or more similar products. Driven by the receipt of these current performance capabilities, the CAM application 178 may then apply automated rules to the values of the received current performance capabilities to determine the desired battery power utilization of the identified product being developed. In turn, the CAM application 178 may then search and locate battery related parts (e.g., a battery, charger, or such) that meet the determined desired battery power utilization for the identified product being developed. The searched parts may also be digitized in the central database 130, in databases accessed at vendor websites 174, or stored in any other locations communicatively coupled, through network 140 or the like, to the CAM application 178. The CAM application 178 may apply further automated rules to the located parts to optimally select the particular parts for the identified product to achieve the desired battery power utilization. The CAM application 178 may use the selected parts in the simulation for continuing the development of the identified product.

Method of Product Benchmarking

Figure 2:
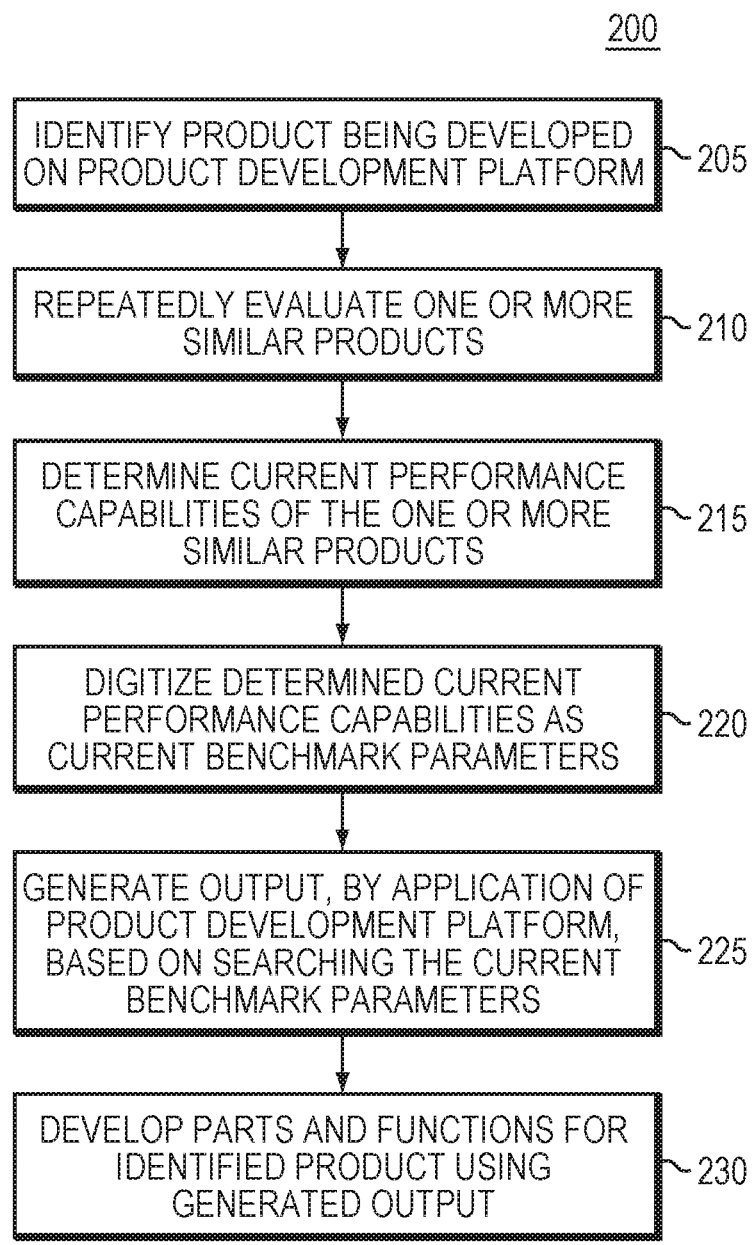
FIG. 2 is a flowchart depicting an example method of developing a product using product benchmarking in embodiments of the present invention.

FIG. 2 is a flowchart depicting an example method 200 of developing a product using product benchmarking in embodiments 100 of the present invention. The product benchmarking facilitates deciding on critical success factors (critical competitive features) for developing the product, based on tracking and considering the performance capabilities of similar products. In the case of automobiles, these performance capabilities may include gas mileage of a car, the towing capacity of a truck, the cargo volume of a semi-truck, the load capacity of an excavator, and such. The method 200 is executed by one or more processors coupled to memory with computer code instructions stored thereon. In embodiments, the example method 200 may be executed by the computer system 100 of FIG. 1. The method 200 begins at step 205, by identifying a product being developed on a product development platform 160 (e.g., PLM platform). In some embodiments the identified product is an automobile, but the identified product may be any product under development without limitation.

At step 210, the method 200 repeatedly evaluates one or more products similar in operation to the identified product under development. The one or more similar products may be competing products to the identified product of step 205 being developed, such as competing products in the same product space or industry as the identified product. The repeated evaluation performed by method 200 (step 210) may include executing a set of tests on components (parts) of the one or more similar products and taking measurements of the components during the set of tests. For example, the set of tests may be run repeatedly by operating similar automobiles. During the set of tests, the method 200, step 210, may measure (1) the maximum horsepower (HP) of the automobiles' engines, and (2) the brake specific fuel consumption (BSFC) of the automobile's engines, which is a measure of the amount of fuel consumed per unit of power produced by the automobile's engines, or non-limiting example.

The set of tests may be executed by operating and measuring real-world products (e.g., operating real-world automobiles) or by simulating the real-world products in a modeling application 178 integrated with the product development platform 160. In embodiments that operate real-world products, sensors installed at the components, and coupled to a controller 176, automatically take the measurements at the components (e.g., measuring maximum HP and BSFC at engine components) during the set of tests. In other embodiments that operate real-world products, a test engine takes the measurements at the components (e.g., measuring maximum HP and BSFC) during the set of tests using automated tools. In embodiments that simulate real-world products, the modeling application 178 (e.g., CAD, CAM, and the like) takes measurements of the simulated components of the real-world products (e.g., measuring maximum HP and BSFC of simulated engine components of the real-world automobiles) during the set of tests executed on the simulated products.

At step 215, the method 200 determines the current performance capabilities of the one or more similar products evaluated at step 210. In some embodiments, the method 200 (step 215) applies automated rules to the measurements of the components of a given simulated product (e.g., taken via sensors, test engineer using automated tools, simulation, and such) to determine the current performance capabilities. The automated rules may apply different formulas, weights, parameters, and the like to the measurements from the different product components to determine current performance capabilities of the given similar product. For non-limiting example, the method 200, at step 215, may determine the optimal gallons per hour of fuel flow volume through the fuel pump (GPH) of a similar automobile engine by applying automated rules to the measured maximum HP and BSFC from the engine components of the similar automobile, such as optimal GPH=(maximum HP*BSFC)/6. The controller 176 coupled to the component sensors or the modeling application 178 may determine the current performance capabilities by applying the automated rules (e.g., GPH=(maximum HP*BSFC)/6) to the measurements (e.g., maximum HP and BSFC) taken by the sensors, and transmit the determined current performance capabilities (e.g., optimal GPH) to the product development platform 160. For another example, the test engineer may determine the current performance capabilities (e.g., optimal GPH) by using automated tools that apply the automated rules (e.g., GPH=(maximum HP*BSFC)/6) to the measurements (e.g., maximum HP and BSFC) taken by the test engineer. The test engineer (or the automated tools used by the test engineer) may provide the determined current performance capabilities (e.g., optimal GPH): via a user interface (e.g., ENOVIA Grid browser user interface application) integrated into the product development platform 160, in a spreadsheet that is automatically processed by an application integrated into product development platform 160, and such.

The measurements (e.g., maximum HP and BSFC) may also be provided directly (e.g., from controller 176, modeling application 178, automated tools, test engineer, and such) to the product development platform 160, which applies the automated rules (e.g., GPH=(maximum HP*BSFC)/6) to the measurements to determine the current performance capabilities (e.g., optimal GPH). Further, the determined current performance capabilities (e.g., optimal GPH) may be repeatedly received from the vendor websites 174 by the product development platform 160 accessing a search engine, other information feed, product literature, consumer surveys, or the like related to the one or more similar products.

At step 220, the method 200 receives from step 215 and digitizes the determined current performance capabilities (e.g., optimal GPH) as current benchmark parameters in a central database 130 integrated into the product development platform. The digitizing formats the current benchmark parameters online in electronic, digital form in the central database 130. In some embodiments, central database 130 is an ENOVIA database integrated into the ENOVIA PLM platform. The method 200 (step 220) may digitize the determined current performance capabilities by creating new (distinct) components (e.g., tables, indexes, objects, attributes, and the like) specific to product benchmarking in the central database 130 or reusing existing components in the central database 130. For example, in the embodiment of the ENOVIA database, the method 200 (step 220) may reuse requirements database components to digitize the one or more similar products and the benchmark parameters of the one or more similar products. The method 200 (step 220) may digitize the current benchmark parameters (instantly) in response to interaction by a user adding, deleting, updating, and such existing benchmark parameters on a user interface. The method 200 (step 220) may also apply automated rules or functions to digitize current benchmark parameters, as the determined performance capabilities of the one or more similar products change (in real-time). In this way, the digitized current benchmark parameters in the central database 130 are continuously accurate and instantly visible for the functions of different users 105 of the product development platform 160 in different location, including users 105 associated with one or more of: project management, product definition, engineering, manufacturing, sourcing, and testing.

At step 225, the method 200 generates output, by applications of the product development platform 160, based on searching the current benchmark parameters. At step 230, the method 200 then develops parts and functions for the identified product using the generated output of step 225. In example embodiments, the method 200 (step 225) generates output by a user interface application 120 of the product development platform displaying to a user 105 a matrix. The matrix may include (i) columns representing the one or more similar products, (ii) rows representing the current benchmark parameters retrieved from searching the central database 130, and (iii) cells each representing the associated value of an intersecting similar product and current benchmark parameter in the matrix. In some embodiments, the user interface application 120 may be the ENOVIA Grid browser in a customized configuration with the ENOVIA Requirements Manager application. In other embodiments, the user interface application 120 may be a type of grid browser not specific to the Requirements Manager application (or other requirements management applications).

The ENOVIA Requirements Manager application is a solution of the ENOVIA Product Lifecycle Management (PLM) platform that typically enables users to define complex products, including their functionality and logical components, and link requirements for the complex products to program and project management activities, to establish full traceability of the product development. Other requirements management applications are suitable. The ENOVIA Requirements Manager application may be configured to interface (plug-in) with the ENOVIA Grid browser component of the ENOVIA PLM platform. The Grid browser is a common (reusable) out-of-the-box user interface component of the ENOVIA PLM platform, which is coupled to the ENOVIA Database and includes a 2×2 graphical matrix display. The ENOVIA Grid browser may be specifically (customizably) configured to interface with applications of the ENOVIA PLM platform (e.g., ENOVIA Requirements Manager, ENOVIA Project Manager, and the like). A given application, through the specific/customized configured interface, may display information to the user from the ENOVIA Database via the Grid browser according to data relationships defined within the given application, and enable the user to edit the information via the Grid browser according to the defined data relationships. Accordingly, in a specific/customized configuration with the Requirements Manager application, the Grid Browser may depict components of the defined complex products as grid columns, the linked requirements of the defined complex product components as grid rows, and provide traceability of the defined complex product components to the linked requirements in the intersecting cells according to the defined data relationships.

A user 105 or system communicatively coupled to the product development platform 160 may configure the ENOVIA Requirements Manager application in a new way to define data relationships that track critical competitive benchmarked features (current benchmark parameters) of the one or more similar products, and configure the ENOVIA Grid Browser, in a new specific/customized configuration with the Requirements Manager application, to enable user 105 to interact with the product development platform 160 to view, edit, add, search, filter, compare, and such the critical competitive benchmarked features (current benchmark parameters) for developing parts and functions for the identified product.

Note that the use of the ENOVIA Requirements Manager application and the ENOVIA Grid browser user interface application is only a non-limiting example configuration for defining/modeling, displaying, editing, and such benchmarked features. Configurations for defining, displaying, editing, and such benchmarked features can be implemented in other ways within a product development platform 160 without limitation. For example, another data modeling application integrated within (or communicatively coupled to) the product development platform 160 can be implemented or configured to define data relationships (models) of the current benchmark parameter. For further example, another user interface application integrated within (or communicatively coupled to) the product development platform 160 can be implemented or configured to display and enable user editing, searching, filter, comparing, and the like according to the defined data relationships (models).

In other example embodiments, method 200 (step 225) generates output by invoking (driving) a modeling application (e.g., CAM application 178) integrated in the product development platform 160 to automatically determine a part or function for the identified product under development. The modeling application may search the current benchmark parameters to locate particular parameters and, in response to the search, perform different simulated scenarios based on the particular parameters to determine the part or function. For example, the CAM application 178 (3D design and simulation software) may be used to develop a fuel pump for the identified automobile being developed (being launched). As part of designing the fuel pump, the CAM application 178 may search the current benchmark parameters (based on defined/modeled relationships between the current benchmark parameters and the one or more similar products) to locate the optimal GPH determined for similar automobiles. In response to the search, the CAM application 178 may simulate adjusting the diameter of the fuel pump outflow of the identified automobile to determine the optimum diameter (e.g., +/−0.2 mm) at which the fuel flow volume of the fuel pump matches the located optimal GPH. In this way, the CAM application 178 may virtually test the fuel pump of the identified product during development within the integrated product development platform to determine a fuel pump design that delivers the optimal GPH for the identified automobile relative to similar automobiles.

In yet other example embodiments, the method 200 (step 225) generates output by invoking (causing) a manufacturing application or system (controller) at step 230, such as a manufacturing execution system (MES) 172, integrated with the product development platform 160 to automatically assemble a prototype of the identified product as the identified product is being developed. The MES 172 may search the current benchmark parameters (based on defined/modeled relationships between the current benchmark parameters and the one or more similar products) to locate particular parameters (critical success factors) related to an obsolete part of the prototype and, in response to the search, use automated rules to analyze the particular parameters to determine the optimal substitute part for assembling the prototype. For example, the MES 172 may search the current benchmark parameters to locate the optimal GPH for similar automobiles to an identified automobile being developed. In response to the search, the MES 172 may test different possible substitute fuel pumps (to replace an originally selected fuel pump for the identified automobile) within the product development platform to determine which substitute fuel pump delivers the optimal GPH relative to similar products. The MES 172 may then automatically assemble a prototype of the identified automobile with the determined substitute fuel pump.

Data-Driven Model for Performing Product Benchmarking

FIGS. 3A-3D are block diagrams depicting a data-driven model for performing product benchmarking online in embodiments of the present invention. In these embodiments, the system 100 of FIG. 1 or the method 200 of FIG. 2 may configure and execute the data-driven model depicted in FIGS. 3A-3B. These embodiments configure an existing user interface application 120 and central database 130 integrated with a product development platform (e.g., PLM platform) to provide and execute the data-driven model for performing online product benchmarking, without the need to design or implement changes to the product development platform.

In an example of these embodiments, the data-driven model for performing product benchmarking may be configured using the existing Requirements Manager application, Grid browser user interface application, and Database of the ENOVIA Product Lifecycle Management (PLM) platform. The ENOVIA Requirements Manager application is a solution of the ENOVIA Product Lifecycle Management (PLM) platform that typically enables users to define complex products, including their functionality and logical components, and link requirements for the complex products to program and project management activities to establish full traceability of the product development. The Grid browser is a user interface application available out-of-the-box for configuration and use with applications of the ENOVIA PLM platform (including the ENOVIA Requirements Manager application), and coupled to the ENOVIA Database. The Grid browser, in a specific/customized configuration with the Requirements Manager application, may present components of the defined products as grid columns, the linked requirements as grid rows, each grid cell illustrating the tracing of a linked requirement to an intersecting product component.

To configure product benchmarking, the example embodiment reuses the existing database components of the ENOVIA Database and functions of the ENOVIA Requirements Manager application to define and digitize the current determined performance capabilities of products similar in operation to a product being developed (as current benchmark parameters). For example, the example embodiment may reuse the out-of-the-box product requirement features (including database components and functions) of the ENOVIA Database and Requirements Manager application to digitize the current benchmark parameters. The product requirement features of the Requirements Manager application are typically used for the function of performing traceability of product requirements (i.e., tagging end-user requirements for different products or product parts). The example embodiment instead configures the product requirement features for the different function of providing a data-driven model that defines and manages dynamic relationships between data objects (e.g., between current benchmark parameters and the different similar products to enable performing product benchmarking).

Figure 3A:
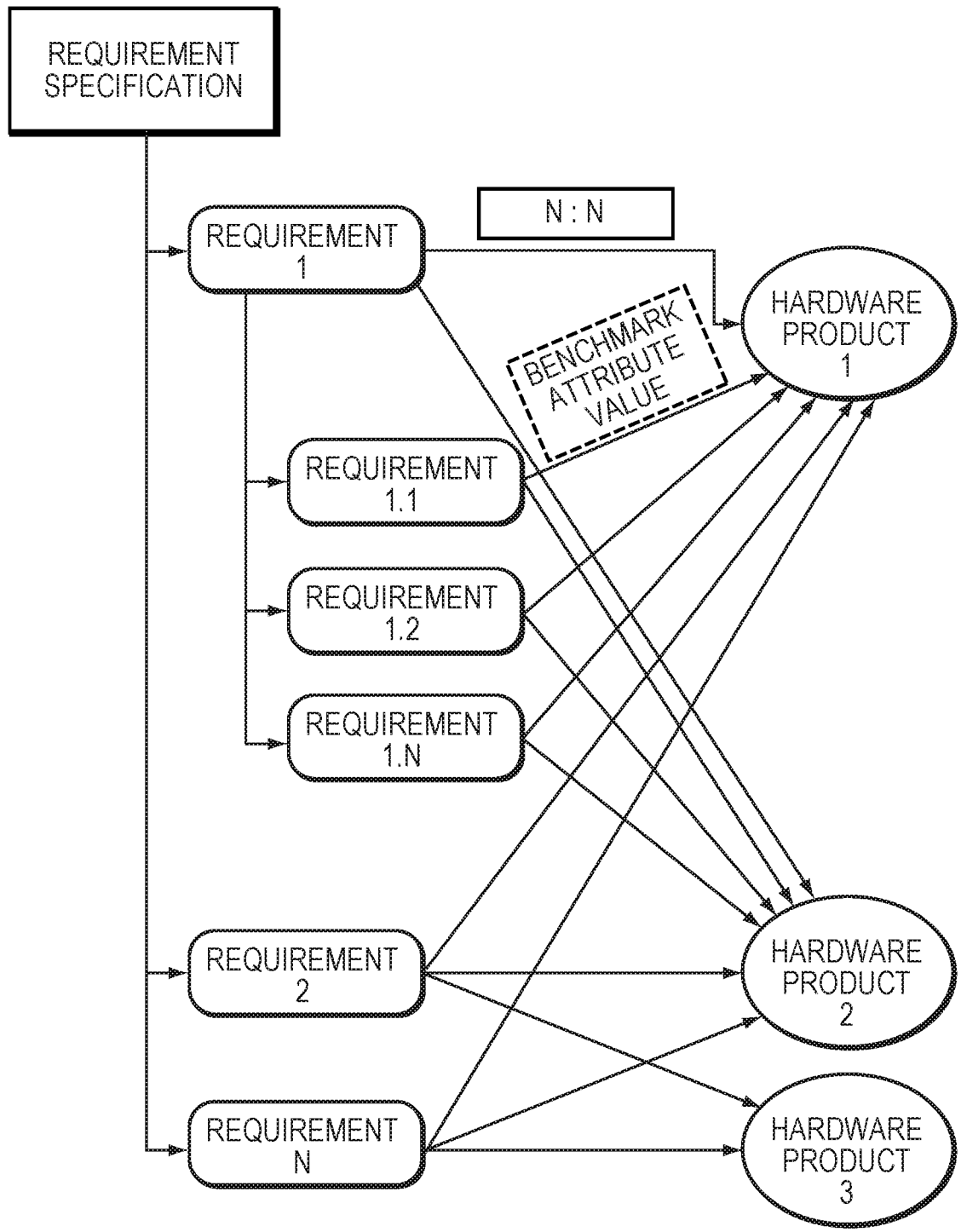

In particular, the example embodiments may reuse the existing "Hardware Product" database components of the ENOVIA Database to digitize the one or more similar products and the existing "Requirement Specification" components of the ENOVIA Database to digitize the benchmark parameters of the one or more similar products. As shown in FIGS. 3A and 3B, "Hardware Product" database components may include "Hardware Product 1," "Hardware Product 2," "Hardware Product 3," and so on. As also shown in FIG. 3A, the "Requirement Specification" database components may include "Requirement 1," having subcomponents "Requirement 1.1," "Requirement 1.2," through "Requirement 1.N," "Requirement 2," through "Requirement N."

The example embodiment provides a data-driven model for product benchmarking by configuring the ENOVIA Requirements Manager application with custom database attributes that connect (link) the reused "Requirement Specification" database component (representing current benchmark parameters) to the reused "Hardware Product" database components (representing the one or more similar products). The example embodiment configures the custom database attributes to define benchmark relationships between the "Requirement Specification" database components and connected "Hardware Product" database components. The example embodiment configures the custom database attributes to define the benchmark relationships without the need to redesign or re-implement the ENOVIA Requirements Manager, Database, or PLM platform.

FIG. 3A shows the configuration in the Requirements Manager application of custom database attributes (Benchmark Attributes), as depicted by arrows, that define benchmark relationships connecting "Hardware Product" database components and "Requirement Specification" database components. The example embodiment uses each configured Benchmark Attribute to digitize the value defining the benchmark relationship between a given "Hardware Products" and a given "Requirement" (current benchmark parameters), as shown in FIG. 3B. That is, for a given "Requirement" (current benchmark parameter), the example embodiment creates a set of Benchmark Attributes, each Benchmark Attribute defining a relationship instance that connects the given current benchmark parameter to a different "Hardware Product" as part of a data-driven model. Each defined relationship instance provides a digital structure to store the benchmark value (Benchmark Attribute Value) for the corresponding connection between the given current benchmark parameter and the different "Hardware Product" in the ENOVIA database.

The ENOVIA Grid browser is a common (reusable) out-of-the-box user interface component of the ENOVIA PLM platform that may be specifically (customizably) configured to interface (plug-in) with applications of the ENOVIA PLM platform, including the ENOVIA Requirements Manager application. In this way, the ENOVIA Grid browser application may be specifically/customizably configured to display information from the ENOVIA Database to the user according to the data relationships defined within the Requirements Manager application, and enable the user to edit, search, filter, and such the information via the Grid browser according to the defined data relationships. In some embodiments, the ENOVIA Grid browser application may be specifically/customizably configured according to application reuse guidelines without having to redesign or re-implement (e.g., write code) for providing the configuration.

For example, using the data-driven model provided by the configuration of the ENOVIA Database and Requirements Manager, the ENOVIA Requirements Manager may dynamically present the relationship between each digitized current benchmark parameter and each of the one or more similar products via the out-of-the-box Grid browser (through the specific, customized interface configuration). The Grid browser includes a 2×2 tabular matrix graphical display. According to the specific/customized configuration with the Requirements Manager application, the Grid browser depicts the "Hardware Product" database components (representing the one or more similar products) as columns of the matrix and the "Requirement" database components (representing the current benchmark parameters) as rows of the matrix. Each cell in the matrix marks the intersection of a "Requirement" database component with a "Hardware Product" database component, and displays the current benchmark value for the intersection (stored in the corresponding Benchmark Attribute representing the relationship between these database components) from the ENOVIA Database.

According to the specific/customized configuration with the Requirements Manager, a user may, in a single view, display, filter, compare, sort, and such each current benchmark parameter (and corresponding current benchmark values) in relation to all connected one or more similar products through one user interface. Using the Grid browser in the specific/customized configuration with the Requirements Manager application, the user may also add, delete, and update the relationships (current benchmark parameter values) between a current benchmark parameter and each of the similar products through one user interface, and add or delete a given benchmark parameter associated to one or more similar products. For example, as a test engineer tests and measures components of a similar product, the test engine may add new current benchmark parameters or corresponding benchmark values determined from the measurements directly into the ENOVIA product development platform (digitized in the integrated ENOVIA Database) using the Grid browser in the specific/customized configuration with the Requirements Manager application. The user also has access to the existing out-of-the-box Grid browser functionality for displaying, generating reports, and such that may be applied across all the digitized benchmark parameters associated to each similar product in the central database 130 (according to the defined relationships in the Requirements Manager application). The Grid browser, driven from the digitized benchmark parameters in the ENOVIA Database, solves the issues of managing and using multiple, large sized, versioned spreadsheet files as in previous benchmarking approaches.

Figure 3C:
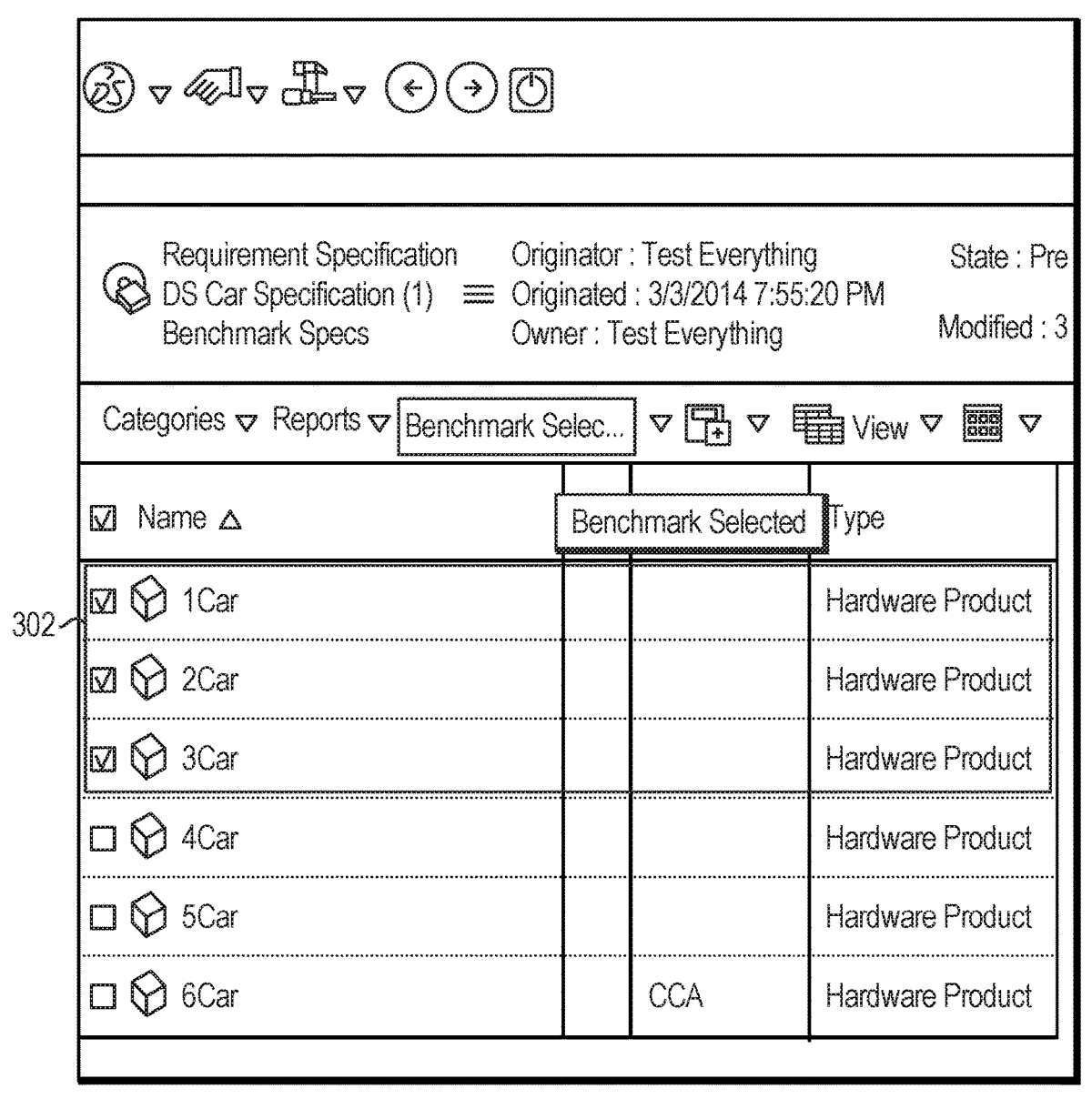

FIG. 3C shows an example ENOVIA Grid browser (or similar grid browser) screen presented to a user to select one or more similar products to display the respective current benchmark parameters. In FIG. 3C, the user selects the similar products "1Car," "2Car," and "3Car." FIG. 3D shows another ENOVIA Grid browser screen presenting the benchmark parameters to the user for the selected one or more products ("1Car," "2Car," and "3Car" as shown in 302). The columns 340 under "Benchmark Vehicles" displays the selected similar products ("1Car," "2Car," and "3Car") and the rows display the current benchmark parameters associated to the similar products, such as current benchmark parameter 325 ("Center of Gravity") and 330 ("Steering Wheel Center"). Cells in the matrix mark the intersection of a given similar product and a given current benchmark parameter, presenting the value of the given current benchmark parameter for the given similar product. For example, cell 335 is the intersection of the current benchmark parameter 330 "Steering Wheel Center" and the similar product "1CAR," and displays the value 198 of the "Steering Wheel Center" for product "1CAR." FIG. 3D also shows the options to present the current benchmark parameters in a chart report 305, enable edit 310 of the current benchmark parameters (e.g., add, delete, update, and the like the current benchmark parameters and associated values), select a different view 315 of the current benchmark parameters, filter 320 the current benchmark parameters, and such.

Note that the use of the ENOVIA Requirements Manager and the ENOVIA Grid browser applications is only an example configuration for defining/modeling, displaying, editing, and such benchmarked features. Configurations for defining, displaying, editing, and such benchmarked features can be implemented in other ways within a product development platform 160 without limitation. For example, another application integrated within (or communicatively coupled to) the product development platform 160 can be implemented or configured to define data relationships (models) of the current benchmark parameter. For further example, another user interface 120 application integrated within (or communicatively coupled to) the product development platform 160 can be implemented or configured to display and enable user editing, searching, filter, and the like according to the defined data relationships (models).

Example Product Benchmarking Sequence

Figure 4:
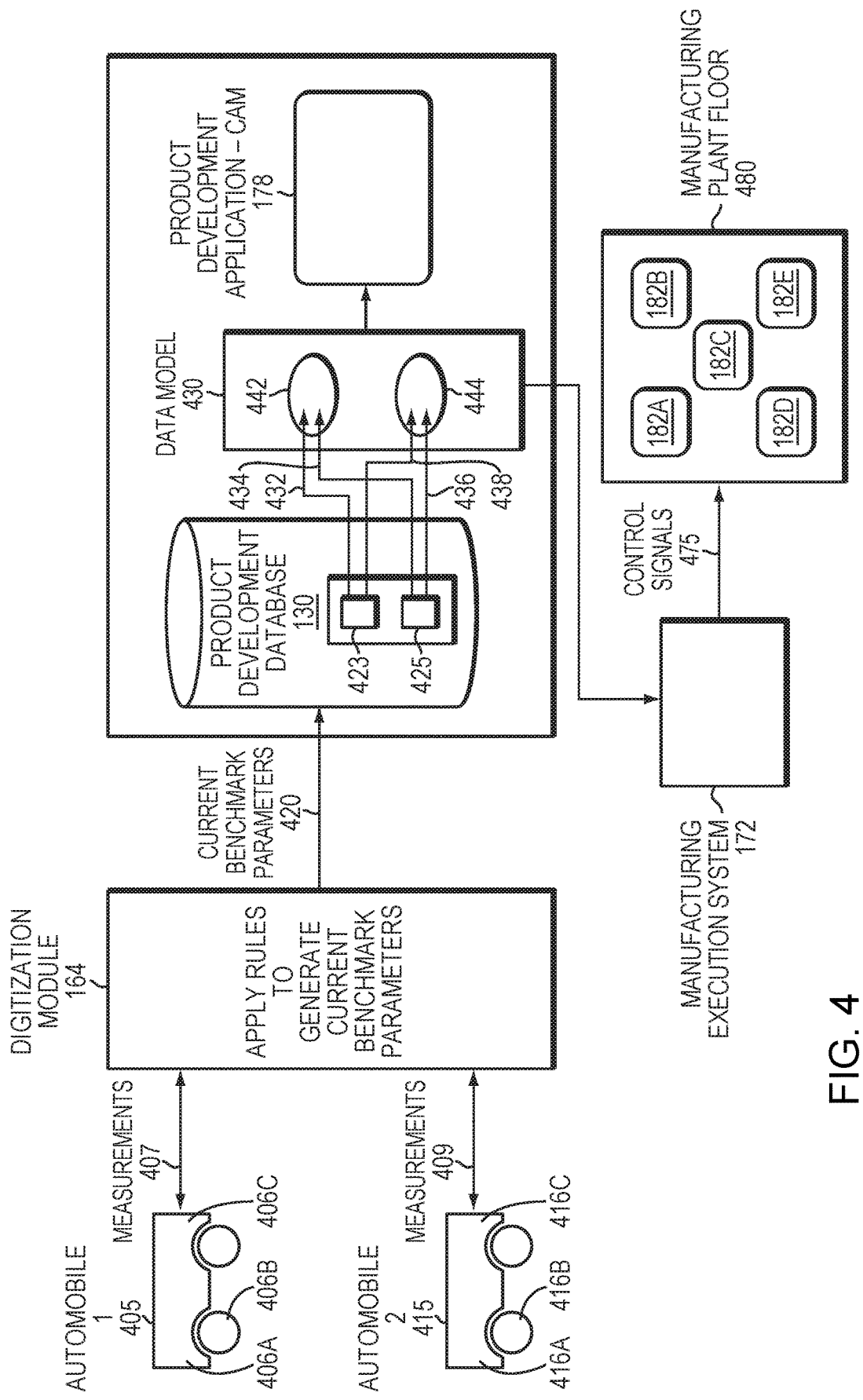
FIG. 4 is a block diagram depicting an example sequence of using product benchmarking for developing and manufacturing an automobile in embodiments of the present invention.

FIG. 4 is a block diagram depicting an example sequence 400 of product benchmarking used in manufacturing of an automobile in embodiments of the present invention. The sequence 400 is used in developing an identified product (an automobile) on a product development platform. The sequence 400 begins by locating two automobiles (Automobile 1 405 and Automobile 2 on 415) similar in operation to the identified automobile being developed, and breaking the automobiles down to their basic components (i.e., "nuts and bolts"). The basic components of Automobile 1 405 include a gas tank 406A, tires 406B, and fuel pump 406C; and the basic components of Automobile 2 415 include a gas tank 416A, tires 416B, and fuel pump 416C. Each of the components of Automobile 1 405, including components 406A, 406B, and 406C, and each of the components of Automobile 2 415, including components 416A, 416B, and 416C, are installed with sensors coupled to a respective controller installed in the respective automobile (Automobile 1 405 and Automobile B 415).

As the controller installed in Automobile 1 405 or test engineer (using automated tools) performs a set of tests on Automobile 1 405, the sensors installed at components 406A, 406B, and 406C take measurements 407 at the respective components 406A, 406B, and 406C, and provide the measurements to the controller installed in Automobile 1 405. The controller installed in Automobile 1 405 transmits the measurements 407, as taken by the sensors, to a digitization module 164 communicatively coupled to the product development platform. The digitization module 164 applies automated rules (e.g., formulas, weights, parameters, and the like) to the measurements 407 from the gas tank 406A, measurements 407 from the tires 406B, and measurements 407 from the fuel pump 406C to determine the current performance capability of gas mileage and emissions for Automobile 1 405. The digitization module 164 similarly receives measurements of other components of Automobile 1 405 and determines different current performance capabilities for Automobile 1 405 from those measurements. In some embodiments, the controller may apply the automated rules to determine the current performance capability of gas mileage and emissions for Automobile 1 405, and transmit the determined current performance capabilities to the digitization module 164.

Similarly, as the controller installed in Automobile 2 415 or test engineer (using automated tools) performs a set of tests on Automobile 2 415, the sensors installed at components 416A, 416B, and 416C take measurements 409 at the respective components 416A, 416B, and 416C, and provide the measurements to the controller installed in Automobile 2 415. The controller installed in Automobile 2 415 transmits the measurements 409, as taken by the sensors, to the digitization module 164. The digitization module 164 applies automated rules (e.g., formulas, weights, parameters, and the like) to the measurements 409 from the gas tank 416A, measurements 409 from the tires 416B, and measurements 409 from the fuel pump 416C to determine the current performance capability of gas mileage and emissions for Automobile 2 415. The digitization module 164 similar receives measurements of other components of Automobile 2 415 and determines different current performance capabilities for Automobile 2 415 from those measurements. In some embodiments, the controller may apply the automated rules to determine the current performance capability of gas mileage and emissions for Automobile 2 415, and transmit the determined current performance capabilities to the digitization module 164.

The digitization module 164 digitizes the determined current performance capability of gas mileage for Automobile 1 405 and Automobile 2 415 by generating a corresponding current benchmark parameter 420 stored in component 423 of a centralized product development database 130 of the product development platform 160. The Digitization module 164 further digitizes the determined current performance capability of emissions for Automobile 1 405 and Automobile 2 415 by generating a corresponding current benchmark parameter 420 stored in component 425 of a centralized product development database 130. In some embodiments, the current benchmark parameters 420 may be digitized in existing database components of the centralized product development database 130 (such as requirements components as shown in FIG. 3A-3B). The Digitization module 164 similarly digitizes other determined current performance capabilities for Automobile 1 405 and Automobile 2 415. The Digitization module 164 also digitizes each of Automobile 1 405 and Automobile 2 415 as components 442, 444 in the centralized product development database 130. In some embodiments, the automobiles 405, 415 may be digitized in an existing database component (such as a product hardware component as shown in FIG. 3A-3D).

The product development platform 160 defines relationships 432, 438 between the database component 423 for gas mileage and database components 442, 444 for Automobile 1 405 and Automobile 2 415 in a data model 430. The product development platform 160 also defines relationships 434, 436 between the database component 425 for emissions and the database components 442, 444 for Automobile 1 405 and Automobile 2 415 in a data model 430, such as a data model defined in the ENOVIA Requirements Manager application or the like. The defined relationships may be managed (e.g., viewed, edited, searched, filtered, compared, and such) through a user interface application 120 (e.g., ENOVIA Grid browser) customizably configured to interface with the data model 430. Each defined relationship 432, 434, 436, 438 is represented by an attribute in the centralized product development database 130 that digitizes the respective benchmark value of the relationship. For example, the attribute may represent the relationship 432 between the gas mileage and Automobile 1 405 (and digitize the value of the gas mileage for Automobile 1 405 at 24 miles/gallon). As the benchmark value of the gas mileage changes for Automobile 1 405, the defined relationship (attribute) 432 instantly and continuously represents the accurate benchmark value, which is used as a critical success factor (critical feature) for developing the identified product on the product development platform 160.

A CAM application 178, simulating the identified automobile as part of the development of the identified automobile, uses the data-driven model 430 to search the current performance capabilities in the integrated centralized product development database 130 to locate data specific to fuel processing functions of the identified automobile. From the search, the CAM application 178 receives the current determined gas mileage and emissions benchmark parameters and associated benchmark values for Automobile 1 405 and Automobile 2 415. Driven by the receipt of these benchmark parameters, the CAM application 178 applies automated rules to determine the desired fuel processing functions of the identified automobile being developed. In turn, the CAM application 178 may then search and locate fuel processing parts (e.g., a fuel pump) that meet the determined desired fuel processing functions for the identified product being developed. The searched parts may also be digitized in the centralized product development database 130, in databases accessed at vendor websites 174, or stored in any other locations communicatively coupled to the CAM application 178. The CAM application 178 may further apply automated rule to the located parts to optimally select the particular fuel pump for the identified automobile to achieve the desired fuel processing functions. The CAM application 178 may use the selected fuel pump in the simulation of the identified automobile for continuing the development of the identified automobile.

The manufacturing execution system (MES) 172, integrated with the product development platform 160, controls (via control signals 475) automatic assembly of a prototype of the identified automobile by machinery 182A-182E on the manufacturing plant floor 480 as the identified automobile is being developed. The MES 172 uses the data-driven model 430 to search the current performance capabilities in the integrated centralized product development database 130 to locate current performance capabilities related to a fuel pump, as the one that was to be used in the prototype is now obsolete. Driven by the receipt of digitized gas mileage and emissions benchmark parameters of Automobile 1 405 and Automobile 2 415, the MES 172 applies automated rules to analyze the desired fuel pumping functions of the identified automobile being developed based on values of the gas mileage and emissions benchmark parameters for Automobile 1 405 and Automobile 2 415. Based on the analysis, the MES 172 determines the optimal substitute fuel pump for the identified automobile and controls (via control signals 475) the machinery 182A-182 of the manufacturing plant floor 480 to assembly the prototype with the substitute fuel part.

Digital Processing Environment

Figure 5:
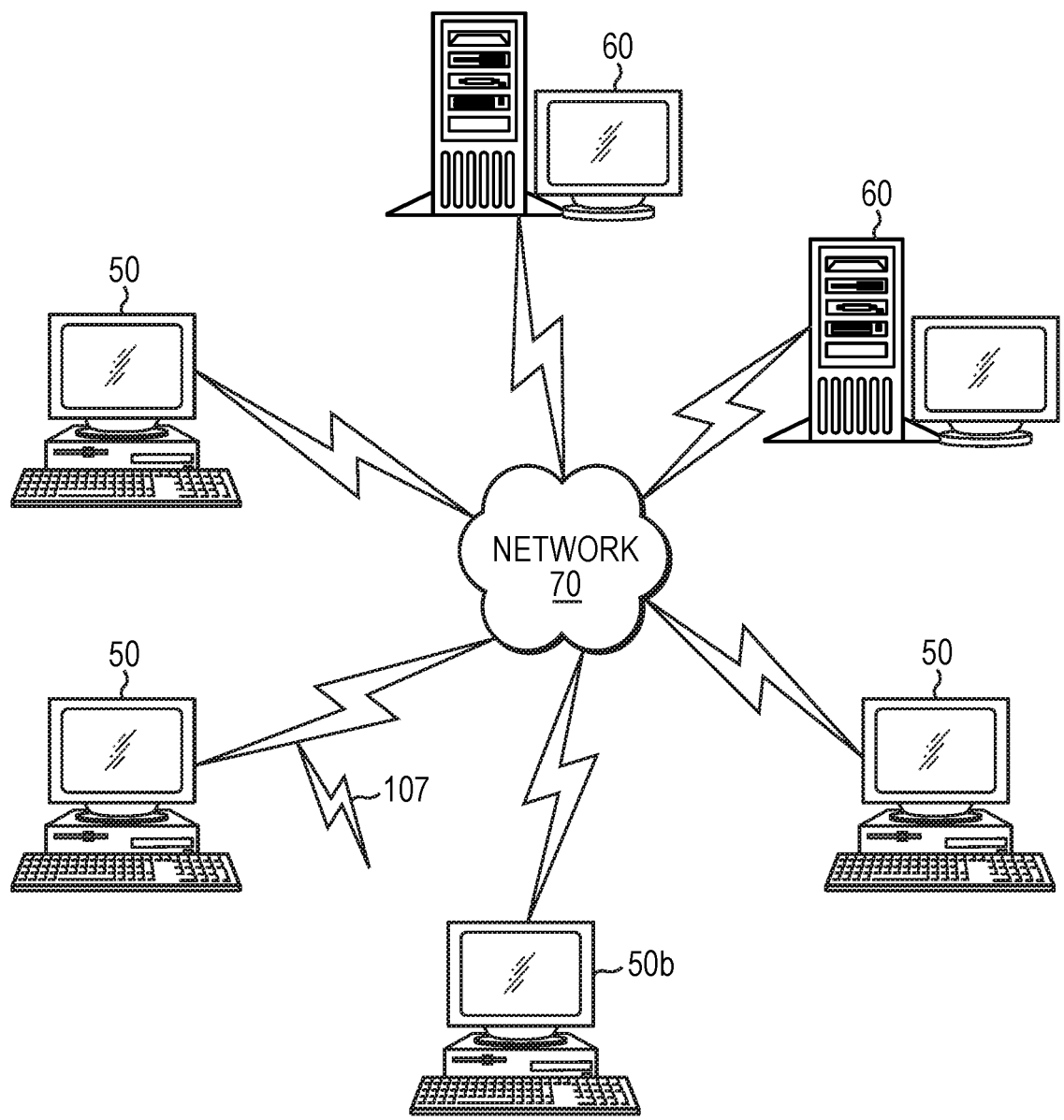
FIG. 5 is a schematic view of a computer network in which embodiments of the present invention are implemented.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 (e.g., 140 of FIG. 1) to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

For example, server computers 60 may be configured as servers of the product development platform 160 in the computer system 100 of FIG. 1, such as servers that execute the development module 164, evaluation module 164, and output module 166 of the product development platform 160. Server computers 60 may also be configured as a data server communicatively coupled to the product development database 130 for retrieving digitized current performance capabilities (i.e., current benchmark parameters) in the system 100 of FIG. 1 for developing an identified product by the product development platform 160. The server computers 60 may further be configured as a controller of a manufacturing execution system (MES) of FIG. 1 or a controller of the automobile 176 that is communicatively coupled to sensors configured on components of the automobile 176 for taking benchmark-related measurements at the automobile components. The server computer 60 may further be configured as servers of vendors that execute vendor applications that the computer system 100 access to retrieve current performance capabilities of products.

Figure 6:
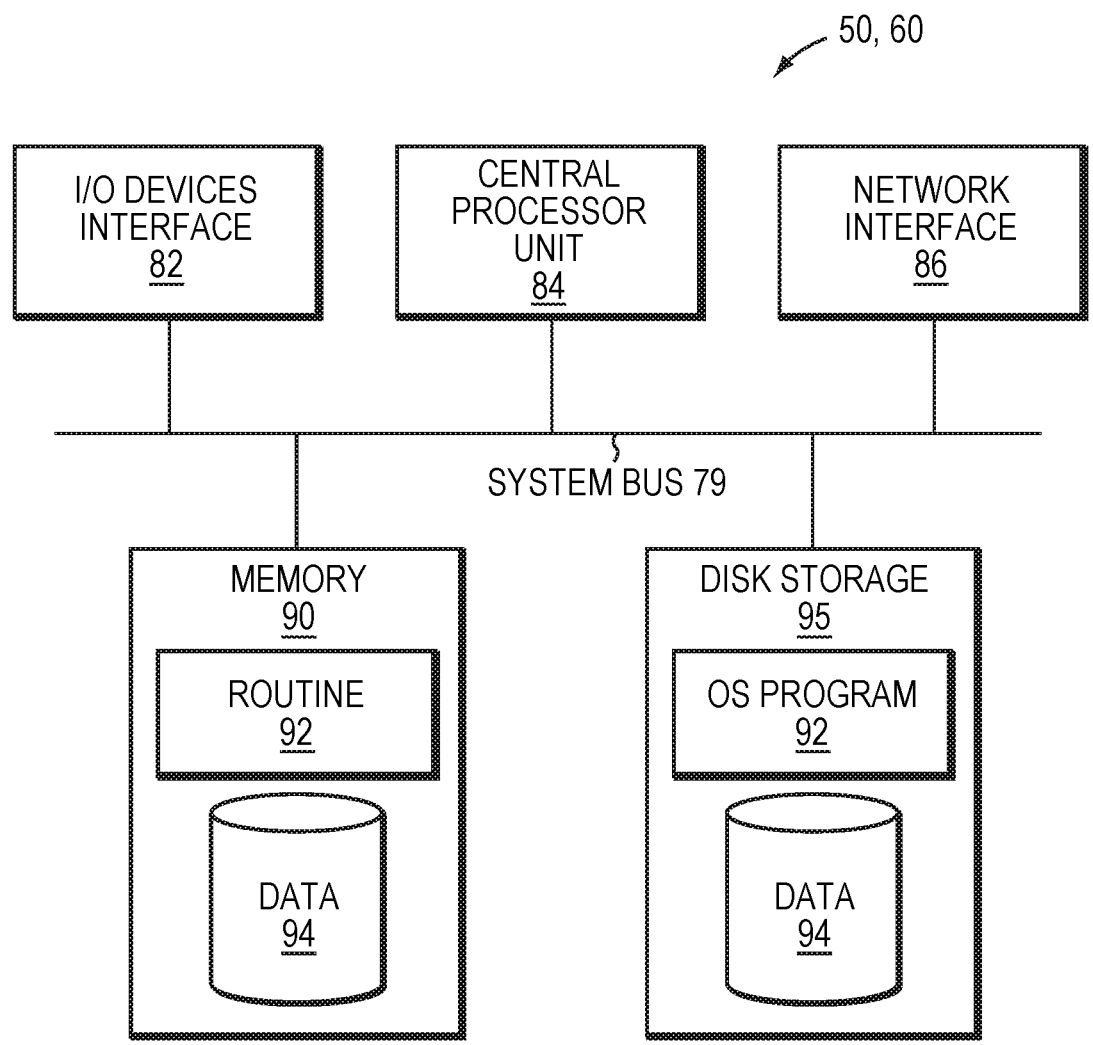
FIG. 6 is a block diagram of a computer node or device in the network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components (e.g., development module 162, digitization module 164, and output module 166) of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 (such as the user interface 120 of the computer system 100 of FIG. 1) for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., benchmarking method 200 of FIG. 2, benchmarking data model of FIGS. 3A-3D, benchmarking implementation 400 of FIG. 4, and supporting code thereof). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of developing design of a real-world product using simulation, the method comprising:
    identifying a real-world product being developed on a product development platform;
    repeatedly evaluating one or more products similar in operation to the identified real-world product, in response to each evaluation:
        in response to running tests on the one or more similar products, automatically collecting measurements taken by sensors configured on sub-components of the one or more similar products;
        generating simulated operational measurements of the one or more similar products and the sub-components by executing a modeling application to simulate operations of the one or more similar products undergoing a set of operational tests using computer-aided design (CAD) models representing the one or more similar products and the sub-components of the one or more similar products;
        determining current performance capabilities of the one or more similar products and the sub-components by applying automated rules to the collected measurements taken by the sensors and the simulated operational measurements generated; and
        digitizing the determined current performance capabilities as current benchmark parameters for developing the identified real-world product, the digitizing including: (i) storing the determined current performance capabilities as benchmark parameters in digital form in respective requirements type database components in a central database integrated within the product development platform and (ii) linking, in the central database, the requirements type database components storing the determined current performance capabilities with hardware type database components representing respective products of the one or more similar products, wherein the requirements type components and hardware type components are existing component types of the central database;
    generating a data-driven model defining relationships of each current benchmark parameter, wherein for a given current benchmark parameter, each defined relationship includes an attribute representing a value of the given benchmark parameter, the attribute connects the given current benchmark parameter to a product of the one or more similar products in the data-driven model;
    generating output, by running an application of the product development platform that searches the current benchmark parameters as stored in the digital form in the requirements type database components in the central database linked to the hardware type database components representing the respective products of the one or more similar products, wherein the searching is based on the generated data-driven model and the searching identifies candidate real-world operational functionalities of the identified real-world product being developed and candidate physical parts of the identified real-world product being developed; and
    defining real-world operational functionalities and physical parts of the identified real-world product by invoking the modeling application to: (i) create multiple CAD models each representing the identified real-world product formed of a respective unique configuration of the candidate physical parts, wherein at least one CAD model, of the multiple CAD models, includes at least one of the candidate physical parts with a physical modification, (ii) perform one or more simulations of the identified real-world product performing the identified candidate real-world operational functionalities using the created multiple CAD models, and (iii) select both the real-world operational functionalities and physical parts of the identified real-world product from among the identified candidate real-world operational functionalities, the candidate physical parts, and the at least one of the candidate physical parts with the physical modification, based on results of the performed one or more simulations, thereby developing design of the real-world product,
    said identifying a real-world product, repeatedly evaluating, generating output, and defining being performed by a processor.

2. The method of claim 1, wherein the product development platform is a product lifecycle management (PLM) platform.

3. The method of claim 1, wherein the evaluating automatically processes a spreadsheet that includes the collected measurements.

4. The method of claim 1, wherein the evaluation includes at least one of:
    automatically obtaining current performance capabilities from web-based applications of vendors associated with the one or more similar products; and automatically parsing current performance capabilities from consumer surveys or other product literature on the one or more similar products.

5. The method of claim 1, wherein digitizing the current performance capabilities includes at least one of: adding, deleting, updating, filtering, and comparing existing benchmark parameters in the central database to generate the current benchmark parameters.

6. The method of claim 1, wherein the digitized current benchmark parameters in the central database are continuously accurate and instantly visible to different users of the product development platform, including users associated with one or more of: project management, product definition, engineering, manufacturing, sourcing, and testing.

7. The method of claim 1, wherein generating the output includes at least one of:
the modeling application automatically determining a given candidate physical part for the identified real-world product based on performing a simulation using the searched current benchmark parameters;
a manufacturing application integrated with the product development platform automatically assembling a prototype of the identified real-world product with a part based on analyzing the current benchmark parameters; and
a user interface application of the product development platform displaying to a user a matrix having (i) columns representing the one or more similar products, (ii) rows representing the current benchmark parameters, and (iii) cells each representing an associated value of an intersecting similar product and current benchmark parameter in the matrix.

8. The method of claim 1, wherein the application is a requirements manager application configured to interface with a grid browser user interface application.

9. A computer system for developing design of a real-world product using simulation, the system comprising:
a processor; and
a memory with computer code instructions stored thereon, the memory operatively coupled to the processor such that, when executed by the processor, the computer code instructions cause the computer system to implement:
a development module configured to identify a real-world product being developed on a product development platform;
a digitization module configured to repeatedly evaluate one or more products similar in operation to the identified real-world product, in response to each evaluation, the digitization module is configured to:
in response to running tests on the one or more similar products, automatically collect measurements taken by sensors configured on sub-components of the one or more similar products;
generate simulated operational measurements of the one or more similar products and the sub-components by executing a modeling application to simulate operations of the one or more similar products undergoing a set of operational tests using computer-aided design (CAD) models representing the one or more similar products and the sub-components of the one or more similar products;
determine current performance capabilities of the one or more similar products and the sub-components by applying automated rules to the collected measurements taken by the sensors and the simulated operational measurements generated;
digitize the determined current performance capabilities as current benchmark parameters for developing the identified real-world product, the digitizing including: (i) storing the determined current performance capabilities as benchmark parameters in digital form in respective requirements type database components in a central database integrated within the product development platform and (ii) linking, in the central database, the requirements type database components storing the determined current performance capabilities with hardware type database components representing respective products of the one or more similar products, wherein the requirements type components and hardware type components are existing component types of the central database; and
generate a data-driven model defining relationships of each current benchmark parameter, wherein for a given current benchmark parameter, each defined relationship includes an attribute representing a value of the given benchmark parameter, the attribute connects the given current benchmark parameter to a product of the one or more similar products in the data-driven model;
an output module configured to generate output, by running an application of the product development platform that searches the current benchmark parameters as stored in the digital form in the requirements type database components in the central database linked to the hardware type database components representing the respective products of the one or more similar products, wherein the searching is based on the generated data-driven model and the searching identifies candidate real-world operational functionalities of the identified real-world product being developed and candidate physical parts of the identified real-world product being developed; and
the development module configured to define real-world operational functionalities and physical parts of the identified real-world product by invoking the modeling application to: (i) create multiple CAD models each representing the identified real-world product formed of a respective unique configuration of the candidate physical parts, wherein at least one CAD model, of the multiple CAD models, includes at least one of the candidate physical parts with a physical modification, (ii) perform one or more simulations of the identified real-world product performing the identified candidate real-world operational functionalities using the created multiple CAD models, and (iii) select both the real-world operational functionalities and physical parts of the identified real-world product from among the identified candidate real-world operational functionalities, the candidate physical parts, and the at least one of the candidate physical parts with the physical modification, based on results of the performed one or more simulations, thereby developing design of the real-world product.

10. The system of claim 9, wherein the product development platform is a product lifecycle management (PLM) platform.

11. The system of claim 9, wherein the digitization module is configured to automatically process a spreadsheet that includes the collected measurements.

12. The system of claim 9, wherein the digitization module is configured to perform at least one of:
   automatically obtaining current performance capabilities from web-based applications of vendors associated with the one or more similar products; and
   automatically parsing current performance capabilities from consumer surveys or other product literature on the one or more similar products.

13. The system of claim 9, wherein digitizing the current performance capabilities includes at least one of: adding, deleting, updating, filtering, and comparing existing benchmark parameters in the central database to generate the current benchmark parameters.

14. The system of claim 9, wherein the digitized current benchmark parameters in the central database are continuously accurate and instantly visible to different users of the product development platform, including users associated with one or more of: project management, product definition, engineering, manufacturing, sourcing, and testing.

15. The system of claim 9, wherein the output module is configured to generate the output by at least one of:
   the modeling application automatically determining a given candidate physical part for the identified real-world product based on performing a simulation using the searched current benchmark parameters;
   a manufacturing application integrated with the product development platform that automatically assembles a prototype of the identified real-world product with a part based on analyzing the current benchmark parameters; and
   a user interface application of the product development platform that displays to a user a matrix having (i) columns representing the one or more similar products, (ii) rows representing the current benchmark parameters, and (iii) cells each representing an associated value of an intersecting similar product and current benchmark parameter in the matrix.

16. The system of claim 9, wherein the application is a requirements manager application configured to interface with a grid browser user interface application.

17. A computer program product for developing design of a real-world product using simulation, the computer program product comprising:
   a non-transitory computer-readable storage medium having code instructions stored thereon, the storage medium operatively coupled to a processor such that, when executed by the processor, the computer code instructions cause the processor to:
      identify a real-world product being developed on a product development platform;
      repeatedly evaluate one or more products similar in operation to the identified real-world product, in response to each evaluation:
         in response to running tests on the one or more similar products, automatically collect measurements taken by sensors configured on sub-components the one or more similar products;
         generate simulated operational measurements of the one or more similar products and the sub-components by executing a modeling application to simulate operations of the one or more similar products undergoing a set of operational tests using computer-aided design (CAD) models representing the one or more similar products and the sub-components of the one or more similar products;
      determine current performance capabilities of the one or more similar products and the sub-components by applying automated rules to the collected measurements taken by the sensors and the operational simulated measurements generated; and
      digitize the determined current performance capabilities as current benchmark parameters for developing the identified real-world product, the digitizing including: (i) storing the determined current performance capabilities as benchmark parameters in digital form in respective requirements type database components in a central database integrated within the product development platform and (ii) linking, in the central database, the requirements type database components storing the determined current performance capabilities with hardware type database components representing respective products of the one or more similar products, wherein the requirements type components and hardware type components are existing component types of the central database;
   generate a data-driven model defining relationships of each current benchmark parameter, wherein for a given current benchmark parameter, each defined relationship includes an attribute representing a value of the given benchmark parameter, the attribute connects the given current benchmark parameter to a product of the one or more similar products in the data-driven model;
   generate output, by running an application of the product development platform that searches the current benchmark parameters as stored in the digital form in the requirements type database components in the central database linked to the hardware type database components representing the respective products of the one or more similar products, wherein the searching is based on the generated data-driven model and the searching identifies candidate real-world operational functionalities of the identified real-world product being developed and candidate physical parts of the identified real-world product being developed; and
   define real-world operational functionalities and physical parts of the identified real-world product by invoking the modeling application to: (i) create multiple CAD models each representing the identified real-world product formed of a respective unique configuration of the candidate physical parts, wherein at least one CAD model, of the multiple CAD models, includes at least one of the candidate physical parts with a physical modification, (ii) perform one or more simulations of the identified real-world product performing the identified candidate real-world operational functionalities using the created multiple CAD models, and (iii) select both the real-world operational functionalities and physical parts of the identified real-world product from among the identified candidate real-world operational functionalities, the candidate physical parts, and the at least one of the candidate physical parts with the physical modification, based on results of the performed one or more simulations, thereby developing design of the real-world product.

* * * * *